United States Patent Office 3,095,433
Patented June 25, 1963

---

3,095,433
PREPARATION OF ALKYL TIN COMPOUNDS
Jesse Roger Mangham, Baton Rouge, La., assignor to Ethyl Corporation, New York, N.Y., a corporation of Virginia
No Drawing. Filed Aug. 23, 1960, Ser. No. 51,254
3 Claims. (Cl. 260—429.7)

This invention relates to and has as its chief object the provision of a novel and highly efficient method for the preparation of alkyl tin compounds.

It has been shown heretofore (German Patent 547,962) that organometallic compounds of certain elements including tin can be prepared by reacting the halides of such elements (e.g. the fluorides, chlorides, etc.) with organic compounds of aluminum of the types $AlR_3$, $R_2AlX$, $RAlX_2$, $R_3Al_2X_3$, in which R is alkyl and X is chlorine, bromine or iodine, the reaction preferably being conducted in methylene chloride. Although other solvents are presented for consideration for use in the process, emphasis is placed in the patent on the desirability of using methylene chloride for this purpose.

It has been found that this emphasis is quite properly placed. In contrast to the good results reported in the patent on the reaction between stannic chloride and alkyl aluminum compounds in methylene chloride, experiments have shown that in hydrocarbon solvents stannic chloride and even stannous chloride when reacted with alkyl aluminum compounds gave impure products (usually in low yield). In one instance no reaction occurred.

Now that alkyl aluminum compounds are commercially-available and the art has learned how to safely handle them, it would be particularly advantageous if alkyl tin compounds could be prepared smoothly and in high yield and purity by reactions involving the use of inert liquid hydrocarbons as the reaction media. The use of such media would permit better control of reaction rates, enable the use of a range of reaction temperatures, and tend to reduce the cost of the process. As will be apparent hereinafter, the process of this invention achieves all of these goals.

Pursuant to this invention, alkyl tin compounds are efficiently prepared by reacting a trialkylaluminum compound with an appropriate tin compound in an inert liquid hydrocarbon. The tin compounds used as reactants in this manner are alkyl tin oxides, alkyl tin salts of aliphatic monocarboxylic acids, stannic sulfide, and stannous sulfate.

Any of a wide variety of inert liquid hydrocarbons can be effectively used in carrying out the process of this invention. Thus recourse can be had to aliphatic, cycloaliphatic and aromatic hydrocarbons, including mixtures of these materials. Examples of appropriate solvents include hexanes; heptanes; octanes; nonanes; decanes; cetane; cyclohexane; methylcyclohexane; isopropylcyclohexane; 1,3-dimethylhexane; 1,4-dimethylcyclohexane; 1,3,5-trimethylcyclohexane; benzene, toluene; ethyl-, propyl- and butylbenzenes; xylenes; 1,2,3,4-tetrahydronaphthalene; hexahydronaphthalene; decahydronaphthalene; petroleum ethers; petroleum naphthas, and the like. Naturally, the hydrocarbon should be substantially anhydrous.

Reaction temperatures can be varied in accordance with the particular reactants and solvent used and generally range from about 20 to about 150° C. Reactions carried out at the reflux temperatures of benzene, toluene, and the xylenes are especially convenient.

The relative proportions of the reactants can likewise be varied from an excess of one to an excess of the other. However, it has been found particularly efficacious to use an excess of the trialkylaluminum compound in relation to the chemical equivalency of the reaction in question, this excess seldom ranging much above five or six moles of trialkylaluminum per mole of tin reactant. The use of such excesses improves the yield of desired tin product, i.e. enhances the ability of the trialkylaluminum compound to introduce its alkyl groups into the tin reactant to produce the desired alkyl tin product.

The reaction times are not critical and can range from minutes to several hours or even longer. On completion of the reaction the reaction mixture is generally hydrolyzed with water and the alkyl tin product isolated from the organic layer by distillation. Other applicable separation techniques include solvent extraction and like procedures.

This invention is further described by the following illustrative examples.

EXAMPLE I

*Reaction of Excess Triethylaluminum With Dibutyltin Oxide*

Triethylaluminum, 13.5 g. (0.118 mole), was added dropwise to a stirred mixture of 6.74 g. (0.027 mole) of dibutyltin oxide in 100 ml. of toluene. The mixture was heated slowly and at 45° C. a clear yellow solution had formed. The solution was then heated at about 80° C. for 3 hours, cooled and hydrolyzed with water.

The hydrolyzed reaction mixture was separated into organic, aqueous and solid phases. The aqueous phase was washed twice with ether and the washings combined with the organic phase. Distillation of the organic fraction yielded ether and toluene plus a higher boiling fraction.

On redistillation at atmospheric pressure, the bulk of the higher boiling fraction boiled at 205–208° C. The yield based on the tin reactant was 70 percent.

Carbon and hydrogen analyses of the redistilled liquid correspond to diethyldibutyltin.

*Analysis.*—Calculated for $(C_2H_5)_2(C_4H_9)_2Sn$: C, 49.56; H, 9.70. Found: C, 50.01; H, 9.50.

EXAMPLE II

*Reaction of Equivalent Amounts of Triethylaluminum and Dibutyltin Oxide*

To a stirred mixture of 22.4 g. (0.090 mole) of dibutyltin oxide in 100 ml. of toluene there was added 7.2 g. (0.063 mole) of triethylaluminum. Addition produced a mild heat effect. After heating at reflux temperature for 4 hours the reaction mixture consisted of a colorless toluene layer containing a fine white solid. The reaction mixture was cooled and hydrolyzed with water. The organic phase was separated and combined with the ether wash of the aqueous and solid phases. After drying and distillation of the ether and toluene, there remained about 8 ml. of a higher boiling liquid. Vacuum distillation of the residual liquid yielded one main fraction, weight 11.85 g. (45 percent yield) B.P. 125–134° C. and 42 mm. Comparison of the refractive index, $n_D^{25}$ 1.4702, and the boiling point with that of product prepared in Example I, $n_D^{26}$ 1.4705, B.P. 205–208° C., indicated that the product was diethyldibutyltin.

EXAMPLE III

*Reaction of Excess Triethylaluminum With Tributyltin Oxide*

To a stirred solution of 29.8 g. (0.05 mole) of tributyltin oxide [bis-(tributyltin)oxide] in 100 ml. of toluene there was added 13.3 g. (0.117 mole) of triethylaluminum. As the dropwise addition progressed, the solution began to warm somewhat, the maximum temperature obtained being about 50° C. No gas was given off nor was there any change in the light golden-yellow color of the solution. The solution was then heated at 70° C. for 2.5 hours without any gas evolution or change in physical appearance. After cooling, the solution was hydrolyzed with water yielding ethane containing a trace of butane.

On completion of hydrolysis, there remained an organic phase, an aqueous phase and a white solid. The solid was filtered off and the aqueous and organic phases separated. The aqueous phase was washed twice with ether, the ether washings combined with the organic phase and dried over CaSO$_4$. After distillation of the ether and toluene, the remaining liquid was distilled under reduced pressure. There was obtained one major fraction: B.P. 79–84° C. at 0.3 mm., 17.4 g., $n_D^{25}$ 1.4717. The yield was over 55 percent. Carbon and hydrogen analyses corresponded to $C_2H_5(C_4H_9)_3Sn$ (i.e. ethyltributyltin).

*Analysis.*—Calculated for $C_2H_5Sn(C_4H_9)_3$: C, 52.71; H, 10.1. Found: C, 52.83; H, 9.54.

Forced hydrolysis of a portion of the distillate by means of hot, concentrated HCl yielded ethane and butane in roughly a 1:3 ratio.

EXAMPLE IV

*Reaction of Equivalent Amounts of Triethylaluminum and Tributyltin Oxide*

To a stirred solution of 35.8 g. (0.06 mole) of tributyltin oxide in 100 ml. of toluene there was added 3.9 g. (0.034 mole) of triethylaluminum. The addition was accompanied by a rise in temperature. The solution was refluxed for 4 hours. Hydrolysis of the cooled solution resulted in the slow evolution of gas. The organic phase was separated and combined with the ether wash of the aqueous and solid phases. After drying and distillation of the ether and toluene at atmospheric pressure, the remaining liquid was vacuum-distilled. Ethyltributyltin was removered and identified by its infrared spectrum.

EXAMPLE V

*Reaction of Triisobutylaluminum With Tributyltin Oxide*

To a stirred solution of 29.8 g. (0.05 mole) of tributyltin oxide in 100 ml. of toluene there was added dropwise 25.2 g. (0.127 mole) of triisobutylaluminum. As the addition progressed the solution began to warm somewhat. On completion of the addition, the stirred solution was maintained at 50° C. for 3 hours. To this point, no gas was given off nor was there any change in physical appearance of the solution. After cooling, the solution was hydrolyzed with water followed by heating to drive off any dissolved gases. The gas so evolved consisted of isobutane with a trace of butane. The hydrolyzed reaction mixture was separated into aqueous, organic and solid phases. The aqueous layer was washed twice with ether and the washings combined with the organic phase. After drying and distilling the ether and toluene at atmospheric pressure, the remaining liquid was distilled under reduced pressure. This produced a fraction (B.P. 80–104° C. at 0.2 mm.) amounting to 23.1 g., $n_D^{23}$ 1.4750 (83.5 percent yield). Carbon and hydrogen analyses of this fraction corresponded to tri-n-butylisobutyltin.

*Analysis.*—Calculated for $(C_4H_9)_4Sn$: C, 55.36; H, 10.45. Found: C, 54.55; H, 9.71.

Forced hydrolysis of the product with hot, concentrated HCl yielded isobutane and butane.

EXAMPLE VI

*Reaction of Triethylaluminum With Stannic Sulfide*

To a stirred suspension of 13.71 g. (0.075 mole) of SnS$_2$ in 100 ml. of toluene, there was added 11.8 g. (0.103 mole) of triethylaluminum. After refluxing for 4 hours, the color of the mixture had changed from yellow-brown to a darker brown. No gas was evolved during addition or refluxing. Upon cooling, the mixture was hydrolyzed with water giving off ethane with a trace of butane.

The hydrolyzed reaction mixture consisted of a yellow-brown organic layer and a water layer containing a fine, gel-like, brown material. The solid material was separated and, on drying in air several days, weighed 27.1 g. It had a color much like the starting compound. The organic and aqueous phases were separated and the aqueous layer was washed twice with ether. The ether washes and the organic phase were combined, dried over CaCl$_2$ and distilled. After removal of the low-boiling liquids up to 110° C. at atmospheric pressure, the distillation was continued under reduced pressure. This led to the recovery of tetraethyltin (B.P. 28–31° C. at 0.05 mm.; $n_D^{25}$ 1.4696) in 22 percent yield.

EXAMPLE VII

*Reaction of Triethylaluminum with Stannous Sulfate*

To a stirred mixture of 10.73 g. (0.05 mole) of SnSO$_4$ in 100 ml. of toluene there was added slowly 12.0 g. (0.105 mole) of Et$_3$Al. Initial addition produced a rise in temperature of the mixture and the evolution of some gas. However, as the addition progressed the heat effect was diminished. The mixture was then refluxed for 6.5 hours. During this period the mixture began to turn yellow and on completion of the reflux period the organic solvent had a yellow-brown appearance. There appeared to be two solids: one was a white solid much like the SnSO$_4$ and the other a fine gray solid which settled on standing. Water hydrolysis yielded ethane.

The reaction mixture was separated into solid, aqueous and organic fractions. The solid and aqueous fractions were washed twice with ether and the washings combined with the organic fraction. At this point it was noted that a slight amount of a fine, white solid was present in the organic phase. As the ether was evaporated additional solid material precipitated. In all, there was obtained 3.33 g. of a white solid which on ignition appeared to be organic. Carbon and hydrogen analyses of the solid corresponded to diethyltin sulfate (24 percent yield based on SnSO$_4$).

*Analysis.*—Calculated for $(C_2H_5)_2SnSO_4$: C, 17.65; H, 3.70. Found: C, 17.83; H, 3.96.

EXAMPLE VIII

*Reaction of Triethylaluminum With Tributyltin Acetate*

Triethylaluminum, 5.9 g. (0.052 mole), was added dropwise to a stirred solution of 17.45 g. (0.05 mole) of tributyltin acetate in 100 ml. of toluene. Gradual addition resulted in a rise in temperature of the reaction mixture. The solution was refluxed for 2 hours then allowed to cool. Water hydrolysis yielded ethane with a trace of butane. The reaction mixture was separated into aqueous (contained a slight amount of solid) and organic fractions. The aqueous fraction was washed twice with ether and the ether wash combined with the organic fraction. After drying, the organic fraction was distilled at atmospheric pressure yielding ether and toluene. The remaining liquid was distilled under reduced pressure yielding a fraction, B.P. 71–73° C. at 0.15 mm., 14.5 g. (91 percent yield), $n_D^{25}$ 1.4708. Therefore the product was ethyltributyltin, these data comparing favorably to the reported values for EtBu$_3$Sn; B.P. 129° C. at 10 mm., $n_D^{20}$ 1.4732. Forced hydrolysis of a portion of the distillate with hot, concentrated hydrochloric acid yielded butane and ethane.

EXAMPLE IX

*Reaction of Excess Tributyltin Acetate With Triethylaluminum*

Triethylaluminum (2.5 ml., 2.05 g., 0.018 mole) was added to a solution of tributyltin acetate (25.2 g., 0.072 mole) in 100 ml. of toluene and the reaction mixture was refluxed for 5 hours. On cooling, the reaction mixture was hydrolyzed with water but no gas evolved indicating that all of the Et$_3$Al had reacted in forming ethyltributyltin.

For an even greater appreciation of the efficiency and smoothness of the process of this invention reference should be had to the following comparative examples which demonstrate some of the difficulties encountered in trying to conduct reactions between tin chloride and alkyl aluminum compounds in hydrocarbon media.

COMPARATIVE EXAMPLE A

To a stirred mixture of 28.5 g. (0.15 mole) of anhydrous stannous chloride ($SnCl_2$) in 100 ml. of heptane there was added 11.3 g. (0.10 mole) of triethylaluminum. As the addition progressed the reaction mixture warmed and turned red-brown. On completion of the addition the mixture was allowed to cool then hydrolyzed with water. The reaction mixture was separated into solid, aqueous and organic fractions. In the course of the separation it was noted that as the organic phase was allowed to stand the red-brown color gradually faded resulting in formation of a white solid. The solid after filtering and drying weighed 0.85 g. On ignition it appeared to be partially organic. The solid was soluble in HCl and concentrated NaOH solution, properties characteristic of $Et_2SnO$. However, carbon and hydrogen analyses indicated the solid to be principally inorganic.

*Analysis.*—Found: 3.36 percent C; 2.22 percent H.

The organic phase was dried and distilled yielding ether, heptane and a higher boiling residue. Vacuum distillation of the residual liquid yielded one main fraction, 5.3 g., B.P. 110–117° C. at 33 mm. Duplicate chlorine analyses of the distillate indicated that it contained 13.85 percent chlorine and that it was an impure product resembling triethyltin chloride.

COMPARATIVE EXAMPLE B

To a stirred solution of 22.6 g. (0.086 mole) of stannic chloride ($SnCl_4$) in 100 ml. of toluene there was added dropwise 15.9 g. (0.139 mole) of triethylaluminum. A vigorous reaction took place on contact of the two reactants. The solution began to darken somewhat as the temperature began to rise. On completion of the addition, the solution had a light yellow-red tinge, but on standing for about 30 minutes the color changed to a dark red-brown. Consequently, the solution was immediately hydrolyzed with water. The organic phase was separated and combined with the ether wash obtained on washing the aqueous phase. After drying, the organic phase was distilled at atmospheric pressure yielding ether, toluene and a liquid residue. Distillation of the residue under reduced pressure (55 mm.) yielded one main fraction, 15.9 g., B.P. 118–123° C. The boiling range, while including that for $Et_4Sn$, 181° C., is also close to that for $Et_3SnCl$, B.P. 89–91° C. at 12 mm., and $EtSnCl_3$, B.P. 196–198° C. Presence of either or both of the latter two compounds was confirmed by a qualitative test for chloride ion with $AgNO_3$ solution in an aqueous suspension of the distillate. Additional workup and analyses showed that the product was impure and probably contained triethyltin chloride.

COMPARATIVE EXAMPLE C

To 0.91 mole of ethylaluminum dichloride in 70 ml. of cyclohexane there was added 6.51 g. (0.025 mole) of $SnCl_4$. Addition produced a definite rise in temperature. The mixture was refluxed for 4 hours during which time the off-gas volume was raised to 800 ml. The yellow color of the reaction mixture gradually faded and was accompanied by formation of a slight amount of a fine, white solid. After cooling, the mixture was hydrolyzed with water. The organic phase was separated and combined with the ether wash of the aqueous phase. After drying, the organic phase was distilled yielding ether, cyclohexane and a solid residue. The residual solvent was removed by vacuum. There remained 4.80 g. of colorless needle-like crystals. The crystals, which could not be completely dried at 40° at 35 mm., gave a positive Beilstein and $AgNO_3$ test for chloride ion. Duplicate chlorine analysis (Mohr method) indicated the solid contained about 15.2 percent Cl. It was noted that the solid did not dissolve completely in either absolute or dilute ethanol. The solid appeared to be partially organic on ignition and slowly softened over the range 110–150°. It appeared that reaction had taken place to a limited extent yielding a slight amount of an alkyltin compound together with an inorganic tin compound either of which may contain chlorine of such a magnitude as to bring the over-all chlorine content to 15.2 percent.

COMPARATIVE EXAMPLE D

*Preparation of isobutylaluminum dichloride.*—Under a blanket of dry $N_2$, a reaction flask was charged with 26.6 g. (0.2 mole) of $AlCl_3$. To this was added 17.8 g. (0.090 mole) of triisobutylaluminum. Addition resulted in a rise in temperature of the reaction mixture. The mixture was heated for 0.5 hour but since it began to take on a dark gray appearance the heating was discontinued. A slight amount of $AlCl_3$ remained unreacted.

After 100 ml. of hexane was added to the above reaction mixture there was added 6.5 g. (0.025 mole) of $SnCl_4$. Addition resulted in a rise in temperature of the reaction mixture and temporary fading of the gray color. After refluxing for 5 hours the reaction mixture consisted of an amber-colored solution and a fine gray solid. Water hydrolysis resulted in evolution of 7.3 liters of gas, equivalent to the calculated volume indicating that no reaction had occurred between the stannic chloride and the alkyl aluminum compound.

Other illustrative examples of the process of this invention are given in abbreviated form in the following table, use being made in each instance to the detailed procedure of Example I except as otherwise noted.

TABLE

| Example | Tin Reactant | Alkyl Aluminum Reactant | Solvent and Temperature | Time, hour |
|---|---|---|---|---|
| X | Diisopropyl tin oxide | Trimethyl aluminum | Mixed xylenes, 75° C | 10 |
| XI [1] | Dibutyl tin diacetate (0.05 mole). | Tri-(2-ethylhexyl)aluminum (0.05 mole). | Refluxing 2,2,4-trimethyl pentane (250 ml.). | 3 |
| XII | Tri-(decyl) tin oxide (0.05 mole). | Tripropyl aluminum (0.15 mole). | Refluxing cyclohexane | 1 |
| XIII [2] | Stannic sulfide | Triisobutyl aluminum | Refluxing ethylbenzene | 8 |
| XIV [1] | Dibenzyl tin diacetate (0.025 mole). | Triethyl aluminum (0.05 mole). | Refluxing benzene | 4 |
| XV [3] | Stannous sulfate | Tri-(decyl) aluminum | 1,2,3,4-Tetrahydronaphthalene, 140° C. | 2 |
| XVI [1] | Dimethyl tin dilaurate (0.025 mole). | Triethyl aluminum (0.05 mole). | Petroleum naphtha, 60° C | 6 |

[1] Procedure of Example VIII.
[2] Procedure of Example VI.
[3] Procedure of Example VII.

Produced in Examples X–XVI inclusive: diisopropyldimethyl tin, dibutyldi-2-ethylhexyl tin, tri-(decyl)propyl tin, tetraisobutyl tin, diethyldibenzyl tin, didecyl tin sulfate, and diethyldimethyl tin, respectively.

The trialkyl aluminum reactants generally contain up to about 30 carbon atoms in the molecule, preferably each alkyl group containing up to about 10 carbon atoms. Illustrative of such compounds are trimethyl aluminum, triethyl aluminum, triisopropyl aluminum, tributyl aluminum, triisobutyl aluminum, the triamyl aluminums, the trihexyl aluminums, the trioctyl aluminums, the tri-(decyl)aluminums, butyldiethyl aluminum, and the like. From the standpoint of cost and availability the lower alkyl aluminum compounds are preferred. All of these reactants are soluble in the hydrocarbon diluents used in the practice of this invention. Methods for the preparation of these trialkyl aluminum compounds are well known and reported in the literature; in fact, a number of them are commercially available. If desired, effective use can be made of alkyl aluminum hydrides or alkyl aluminum halides, or mixtures of either or both of these with trialkyl aluminum compounds. As is well known to those skilled in the art, the alkyl aluminum compounds should be maintained and used in a substantially inert and anhydrous atmosphere in order to avoid decomposition.

The tin reactants as used pursuant to this invention include alkyltin oxides, especially those in which the alkyl group contains up to about 10 carbon atoms. These reactants include dialkyltin oxides and trialkyltin oxides, illustrative examples of these compounds being dimethyltin oxide, diamyltin oxide, di-(2-ethylhexyl)tin oxide, diisodecyltin oxide, triethyltin oxide, tri-(hexyl)tin oxide, trinonyltin oxide, and the like. The corresponding alkyltin sulfide can also be used advantageously in practicing this invention. Also, recourse may be had to aralkyl, cycloalkyl or aryltin oxides or sulfides such as dicyclohexyltin oxide, dibenzyltin oxide, diphenyltin oxide, tri-(methylcyclohexyl)tin oxide, tri-(2-phenylethyl)tin oxide, tricumenyltin oxide, dimethyltin sulfide, tributyltin sulfides, and others. Another type of useful tin reactants for use in the practice of this invention comprises the alkyltin salts of monocarboxylic acids. In general, the alkyl groups each contain up to about 10 carbon atoms. These reactants comprise dialkyltin salts and trialkyltin salts in which the anionic portion is derived from a fatty acid ranging from formic acid up to and including stearic acid (see Conant and Blatt, "The Chemistry of Organic Compounds," 3rd ed., 1947, p. 76). Exemplary of these reactants are dimethyltin diformate, diethyltin dicaproate, dibutyltin dilaurate, dihexyltin distearate, dioctyltin divalerate, tripropyltin acetate, tri-sec-butyltin propionate, tri-(decyl)tin formate, and the like. Methods for the preparation of these reactants are known and reported in the literature.

Other appropriate tin reactants for the practice of this invention are stannic sulfide ($SnS_2$) and stannous sulfate ($SnSO_4$).

All of the foregoing tin reactants are reactive with alkyl aluminum compounds in accordance with this invention. Generally speaking, the rate and extent of reaction are greater in the case of those tin reactants which are soluble in the hydrocarbon diluents used in this invention than in the case of those tin reactants which are suspended or slurried in the diluent during the reaction.

The tin compounds prepared by the process of this invention are well known stabilizers for plastics and other synthetic materials (e.g. vinyl plastics such as polyvinyl chloride, etc.). They are also useful as chemical intermediates for the synthesis of antiparasitic containing tin. In addition, the alkyl tin products are of value as ingredients in polymerization catalysts (e.g. U.S. Patent 2,868,772).

What is claimed is:
1. A process for the preparation of alkyl tin compounds which comprises reacting a trialkyl aluminum compound, each alkyl group thereof containing up to 10 carbon atoms, with a tin compound selected from the group consisting of
(1) alkyl tin oxides consisting of tin, two to three alkyl groups per atom of tin, and oxygen, the alkyl groups thereof each having up to 10 carbon atoms,
(2) alkyl tin salts derived solely from monocarboxylic acids having from 1 to 8 carbon atoms, and the alkyl groups thereof each containing up to 10 carbon atoms,
the reaction being conducted in an inert liquid hydrocarbon.

2. A process for the preparation of alkyl tin compounds comprising reacting in the presence of an inert liquid hydrocarbon reaction medium, a trialkyl aluminum compound having alkyl groups each containing up to 10 carbon atoms with an alkyl tin oxide consisting of tin, two to three alkyl groups per atom of tin and oxygen, the alkyl groups thereof each having up to 10 carbon atoms.

3. A process for the preparation of alkyl tin compounds comprising reacting, in the presence of an inert liquid hydrocarbon reaction medium, a trialkyl aluminum compound having alkyl groups each containing up to 10 carbon atoms with an alkyl tin salt, the alkyl groups thereof having up to 10 carbon atoms, and said salt being derived solely from monocarboxylic acids having from 1 to 18 carbon atoms.

References Cited in the file of this patent

UNITED STATES PATENTS

| | | |
|---|---|---|
| 2,859,225 | Blitzer et al. | Nov. 4, 1958 |
| 2,908,674 | Nowlin et al. | Oct. 13, 1959 |
| 2,950,301 | Riddle | Aug. 23, 1960 |
| 2,969,381 | Blitzer et al. | Jan. 24, 1961 |
| 3,007,955 | Blitzer et al. | Nov. 7, 1961 |

OTHER REFERENCES

Zakharkin et al.: "Chem. Abst." 52, 6167 (1958).

UNITED STATES PATENT OFFICE
CERTIFICATE OF CORRECTION

Patent No. 3,095,433                                                June 25, 1963

Jesse Roger Mangham

It is hereby certified that error appears in the above numbered patent requiring correction and that the said Letters Patent should read as corrected below.

Column 3, line 35, for "removered" read -- recovered --; column 8, line 10, after "antiparasitic" insert -- agents --; line 24, for "8" read -- 18 --.

Signed and sealed this 7th day of January 1964.

(SEAL)
Attest:

ERNEST W. SWIDER

Attesting Officer

EDWIN L. REYNOLDS

Acting Commissioner of Patents